(12) United States Patent
Mori et al.

(10) Patent No.: US 7,266,071 B2
(45) Date of Patent: Sep. 4, 2007

(54) MIRROR FIXING STRUCTURE FOR OPTICAL PICKUP

(75) Inventors: Fumiaki Mori, Osaka (JP); Suehiro Harada, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 506 days.

(21) Appl. No.: 10/872,413

(22) Filed: Jun. 22, 2004

(65) Prior Publication Data
US 2005/0024756 A1  Feb. 3, 2005

(30) Foreign Application Priority Data
Jun. 25, 2003 (JP) ............ P.2003-180687

(51) Int. Cl.
*G11B 7/00* (2006.01)
(52) U.S. Cl. .................................. 369/112.29
(58) Field of Classification Search ........ None
See application file for complete search history.

(56) References Cited
U.S. PATENT DOCUMENTS
5,801,891 A * 9/1998 Lloyd ................... 359/871

FOREIGN PATENT DOCUMENTS

| JP | 63-15661 | 4/1988 |
|---|---|---|
| JP | 64-42516 | 3/1989 |
| JP | 2-135922 | 11/1990 |
| JP | 8-111027 | 4/1996 |
| JP | 2002-230809 | 8/2002 |

* cited by examiner

*Primary Examiner*—Paul W. Huber
(74) *Attorney, Agent, or Firm*—Morgan, Lewis & Bockius LLP

(57) ABSTRACT

A mirror fixing structure includes a substantially C-shaped flat plate disposed rearward to hold a half mirror, a single first leg provided rearward of the flat plate to extend downward and inserted between a rear surface of the half mirror and a rear wall of a mount recess, a pair of second right and left legs extended downward from a front of the flat plate and pressed against a front surface of the half mirror to fix the half mirror, and a pair of right and left arms extended forward from the front of the flat plate to a position, in which a total reflection mirror is set, and shaped such that front portions thereof are bent obliquely downward, tip ends thereof are bent in a manner to warp forward, and bent portions thereof are pushed against a front surface of the total reflection mirror.

4 Claims, 8 Drawing Sheets

MIRROR FIXING STRUCTURE FOR OPTICAL PICKUP

BACKGROUND OF THE INVENTION

1. Field of the Invention

The present invention relates to a mirror fixing structure for an optical pickup, in which a half mirror and a total reflection mirror are set in predetermined locations in the optical pickup so that the half mirror and the total reflection mirror are fixed in a manner to be prevented from coming off.

2. Description of the Related Art

In a conventional mirror fixing structure for an optical pickup, a half mirror is fixed by a spring and a total reflection mirror is fixed by another spring, or temporarily fixed with an adhesive.

Therefore, there is caused a problem that two springs are necessary and a working process of fixing a total reflection mirror is necessary in addition to the working process of fixing a half mirror, which lead to an increase in working processes.

Figure 9:
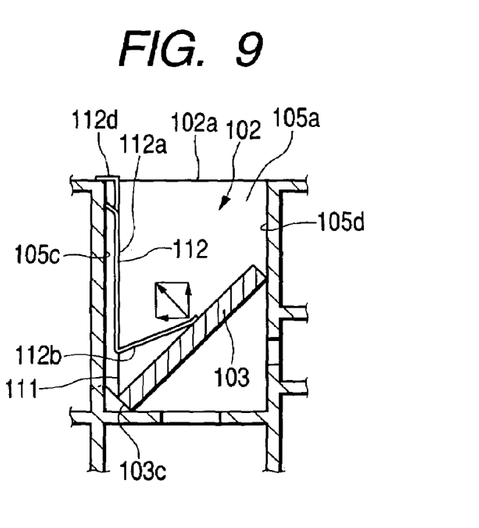
FIG. 9 is a longitudinal, cross sectional view showing a conventional half mirror fixing device for an optical pickup.
Figure 10:
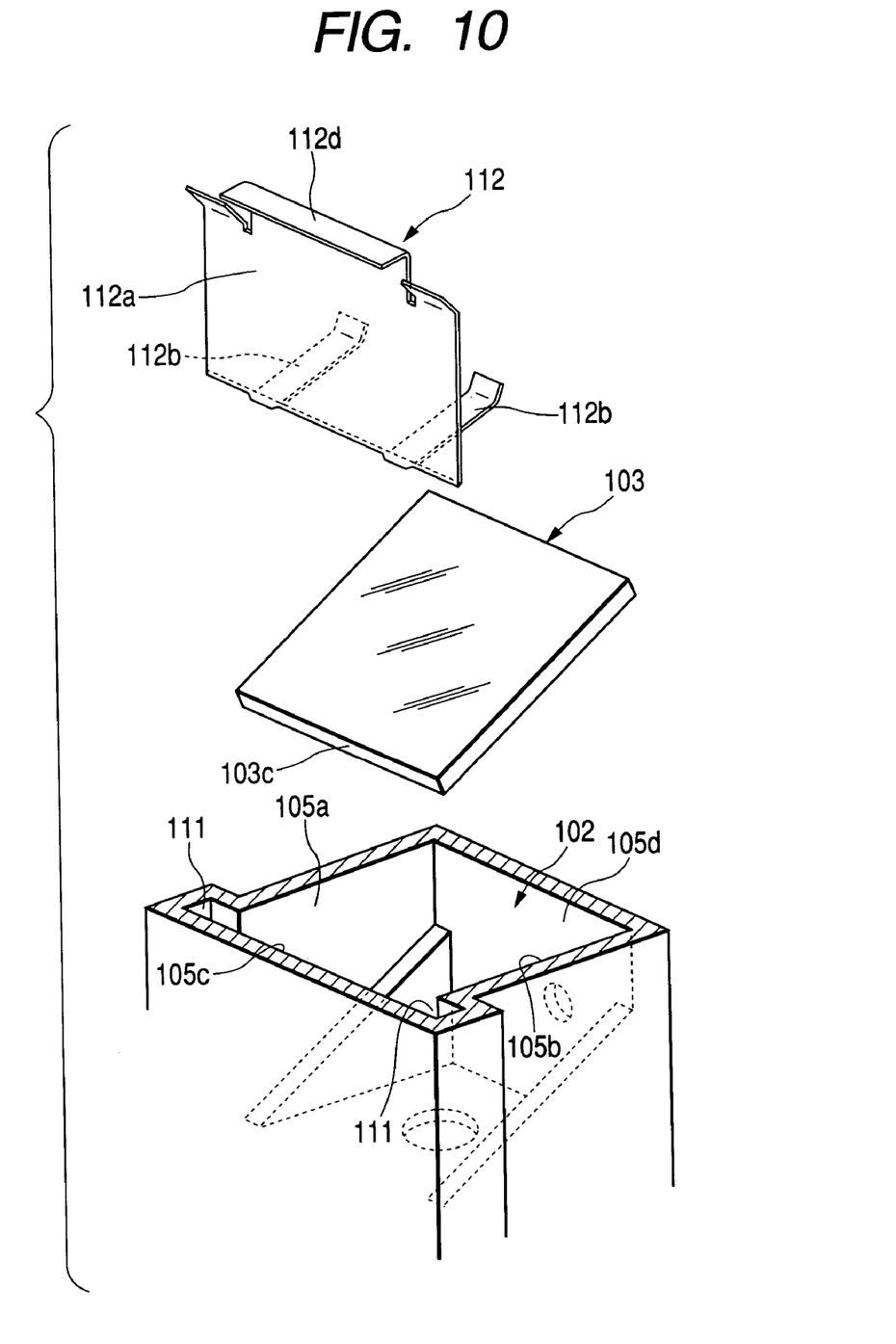
FIG. 10 is an exploded, perspective view showing the device.

A first prior art is shown in FIGS. 9 and 10. A pair of right and left grooves 111 communicated to an opening 102a of a light passing hole 102 are formed on both sides of an inner side 105c among four inner sides 105a to 105d of a light passing hole 102, the inner side 105c being opposed to an inner part side 103c of a half mirror 103, both side edges of a fixture body 112a of a leaf-spring fixture 112 are inserted into the both grooves 111, a pair of right and left presser plates 112b are provided to extend from the both side edges of the fixture body 112a to elastically abut against a surface of the half mirror 103, a pair of right and left engaging pawls 112c are bent from the both side edges of the fixture body 112a in a direction opposed to a direction, in which the presser plates 112b extend, to engage with the inner side 105c, and a latch piece 112d are bent from a center of the fixture body 112a in the same direction as that of the engaging pawls 112c to extend to a peripheral edge of the opening 102a of the light passing hole 102 (see, for example, JP-A-2002-230809).

However, the single half mirror 103 in this structure is fixed only by the leaf-spring fixture 112.

Figure 11:
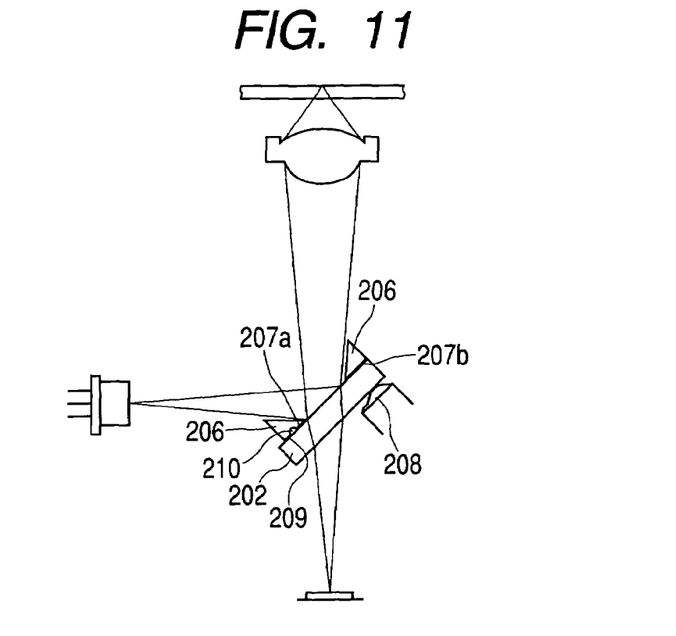
FIG. 11 is a schematic view showing an optical system of a conventional optical pickup device.
Figure 12A:
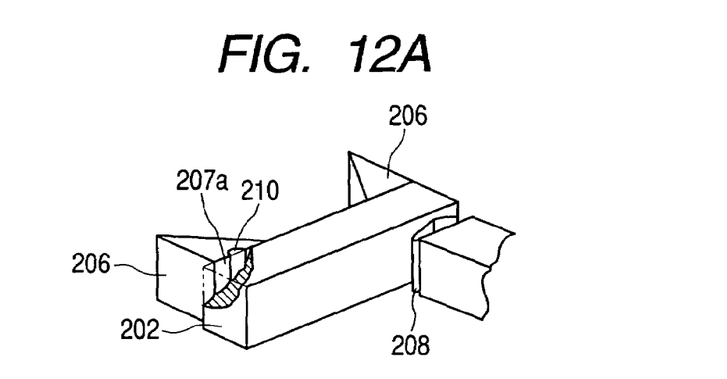
FIG. 12A is an enlarged, perspective view showing a half mirror of the device.
Figure 12B:
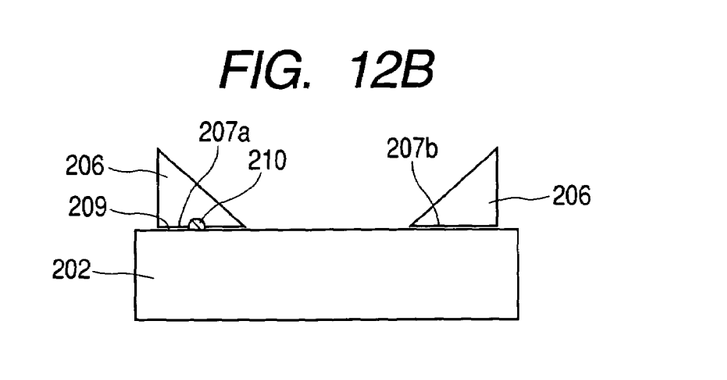
FIG. 12B is an enlarged, perspective view showing the half mirror of the device.

A second prior art is shown in FIGS. 11, 12A and 12B. A half mirror 202 is supported by mirror holding pieces 206, and closely fixed to a mirror bonding and holding surface 207a by means of an adhesive 209 and to a mirror abutting and holding surface 207b by means of a spring 208. A groove 210 is provided on the mirror bonding and holding surface 207a that fixes the half mirror 202 thereto (see, for example, JP-A-8-111027).

However, the half mirror 202 in this structure is fixed only by the spring 208.

SUMMARY OF THE INVENTION

The invention solves the problem of the prior art and has its object to provide a mirror fixing structure for an optical pickup, in which a half mirror and a total reflection mirror can be fixed at the same time by a single mirror fixing member and which can dispense with a spring, or an adhesive, or a pressure jig, which are conventionally used to fix a total reflection mirror, thereby enabling reducing working processes.

The invention has been proposed to solve the above problems, and a first aspect of the invention provides a mirror fixing structure for an optical pickup, in which a half mirror and a total reflection mirror are set in predetermined locations in the optical pickup so that the half mirror and the total reflection mirror are fixed in a manner to be prevented from coming off, the mirror fixing structure includes a substantially C-shaped flat plate disposed rearward to hold the half mirror, a single first leg provided rearward of the flat plate to extend downward and inserted between a rear surface of the half mirror and a rear wall of a mount recess, a pair of second right and left legs extended downward from a front of the flat plate and pressed against a front surface of the half mirror to fix the half mirror, and a pair of right and left arms extended forward from the front of the flat plate to a position, in which the total reflection mirror is set, and shaped such that front portions thereof are bent obliquely downward, tip ends thereof are bent in a manner to warp forward, and bent portions thereof are pushed against a front surface of the total reflection mirror.

A second aspect of the invention provides a mirror fixing structure for an optical pickup, in which a half mirror and a total reflection mirror are set in predetermined locations in the optical pickup so that the half mirror and the total reflection mirror are fixed in a manner to be prevented from coming off, the mirror fixing structure includes a flat plate disposed rearward to hold half mirror, a first leg provided rearward of the flat plate to extend downward and inserted between a rear surface of the half mirror and a rear wall of a mount recess, a second leg extended downward from a front of the flat plate and pressed against a front surface of the half mirror to fix the half mirror, and a pair of right and left arms extended forward from the front of the flat plate to a position, in which the total reflection mirror is set, and shaped such that front portions thereof are bent obliquely downward, tip ends thereof are bent in a manner to warp forward, and bent portions thereof are pushed against a front surface of the total reflection mirror.

According to a third aspect of the invention, the bent portions of the arms are brought into linear contact with the front surface of the total reflection mirror.

According to a fourth aspect of the invention, the arms are provided in pair to include right and left ones and a connection piece is arranged in an appropriate location on a front side of the arms to bridge across the arms in a right and left direction.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Embodiments of a mirror fixing structure for an optical pickup, according to the invention, will be described below with reference to the drawings.

Figure 1:
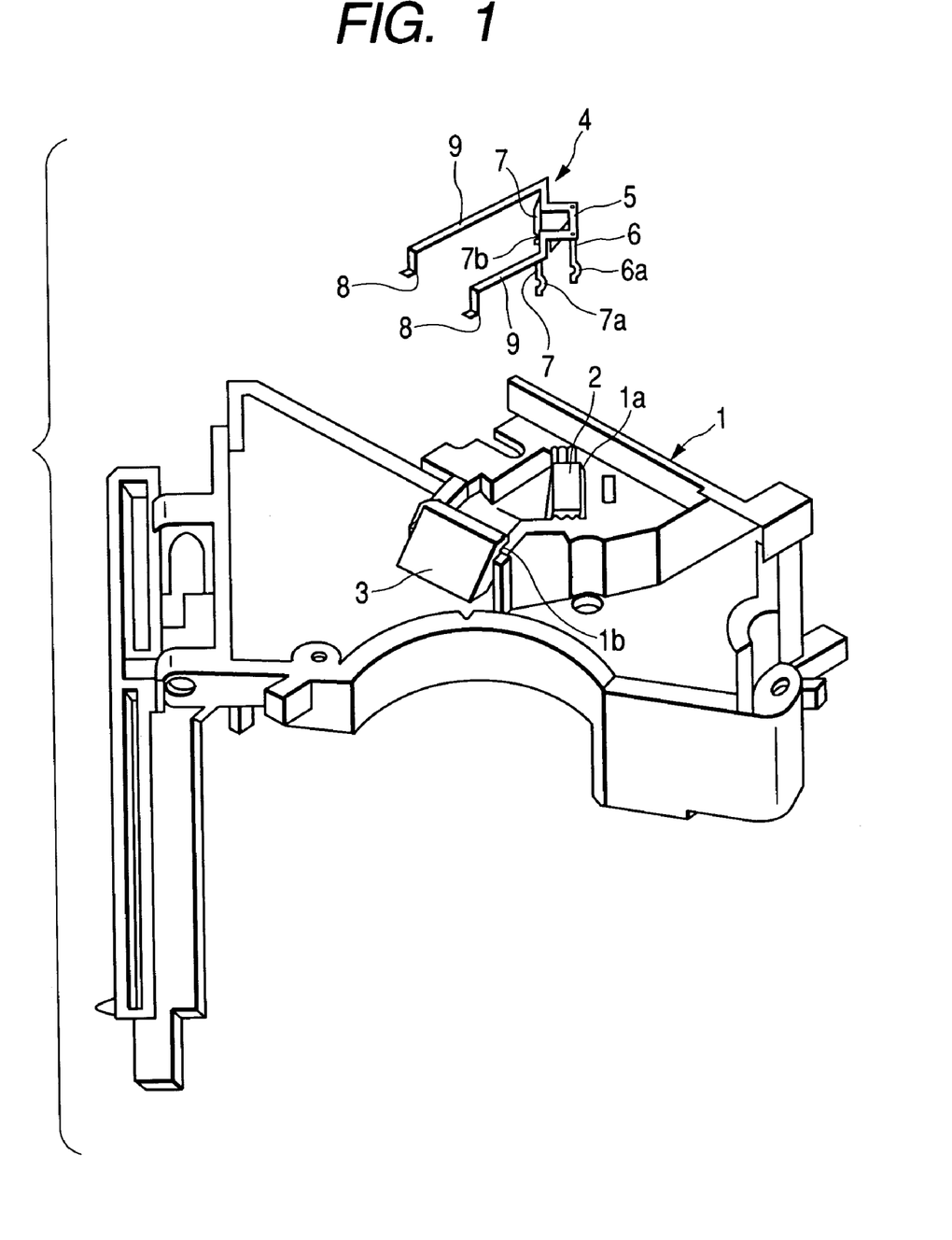
FIG. 1 is an exploded, perspective view showing a state immediately before a mirror fixing structure for an optical pickup, according to a first embodiment of the invention, is fixed.
Figure 2:
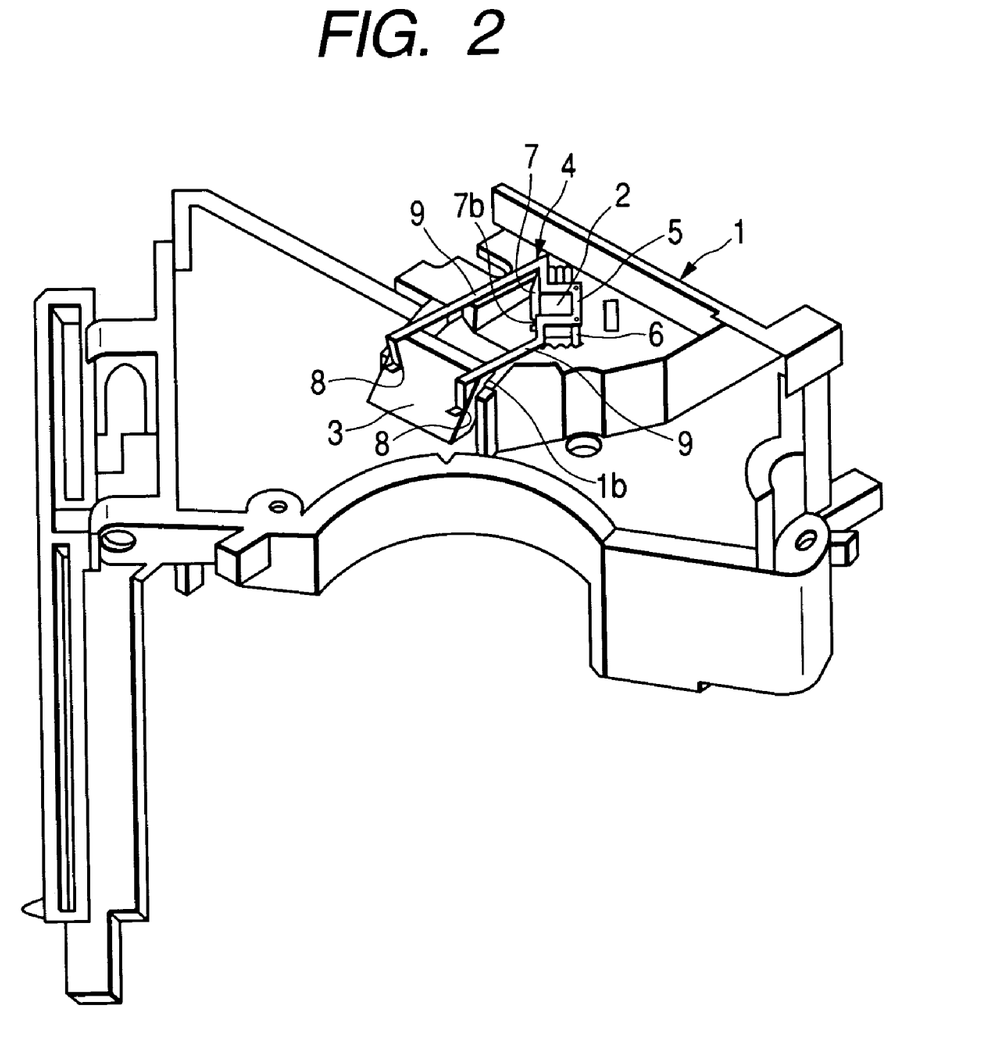
FIG. 2 is a perspective view showing a state when a mirror in the structure is fixed.
Figure 3:
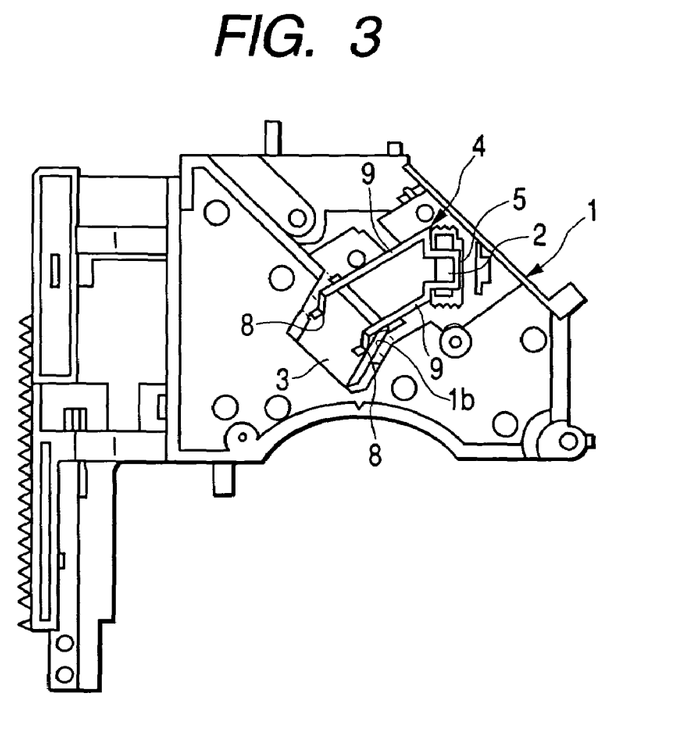
FIG. 3 is a plan view showing a state when the mirror in the structure is fixed.
Figure 4:
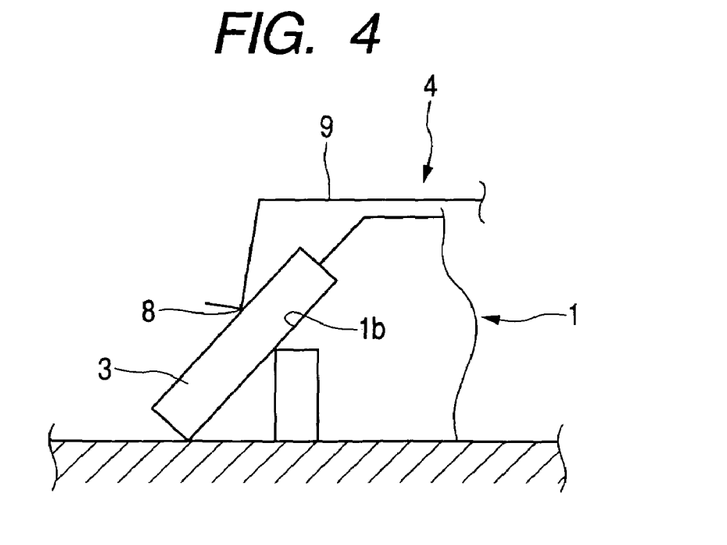
FIG. 4 is a fragmentary, front view showing a state, in which a total reflection mirror is fixed by a mirror fixing member in the structure.

FIG. 1 is an exploded, perspective view showing a state immediately before a mirror in a mirror fixing structure for an optical pickup, according to a first embodiment of the invention, is fixed, FIG. 2 is a perspective view showing a state when a mirror in the structure is fixed, FIG. 3 is a plan view showing a state when the mirror in the structure is fixed, and FIG. 4 is a fragmentary, front view showing a state, in which a total reflection mirror is fixed by a mirror fixing member in the structure.

In a mirror fixing structure for an optical pickup, according to the first embodiment, as shown in FIG. 1, a half mirror 2 is fitted into amount recess 1a, which is substantially rectangular in plan view and provided substantially centrally of for an optical pickup 1, and a total reflection mirror 3 is set on an inclined surface 1b in a predetermined location in front of the half mirror to be inclined obliquely.

The half mirror 2 and the total reflection mirror 3 are fixed by a single mirror fixing member 4, and the mirror fixing member 4 includes a substantially C-shaped flat plate 5 disposed rearward to hold the half mirror 2, a single first leg 6 provided rearward of the flat plate 5 to extend downward and inserted between a rear surface of the half mirror 2 and the mount recess 1a, a pair of second right and left legs 7, 7 extended downward from a front of the flat plate 5 and pressed against a front surface of the half mirror 2 to fix the half mirror 2, and a pair of right and left arms 9, 9 extended forward from the front of the flat plate 5 to a position, in which the total reflection mirror 3 is set, and shaped such that front portions thereof are bent obliquely downward, tip ends thereof are bent in a manner to warp forward, and bent portions 8 thereof are pushed against a front surface of the total reflection mirror 3. Further, the first leg 6 and the pair of second right and left legs 7, 7 are formed at lower ends thereof with substantially arcuate pressing bent portions 6a, 7a, 7a.

In order to use the mirror fixing member 4 formed in the above manner to fix the half mirror 2 and the total reflection mirror 3, which are set in optical pickup 1, at the same time, the first leg 6 of the mirror fixing member 4 is inserted between the rear surface of the half mirror 2 and a rear wall of the mount recess 1a, and the pair of second right and left legs 7, 7 are pushed against the front surface of the half mirror 2 to have the substantially C-shaped flat plate 5 holding an upper surface of the half mirror 2 as shown in FIGS. 2 and 3. Simultaneously therewith, the bent portions 8 of the pair of right and left arms 9, 9 are pushed in locations in the vicinity of right and left edges on the front surface of the total reflection mirror 3, so that the half mirror 2 and the total reflection mirror 3 are fixed at the same time by the mirror fixing member 4. At this time, the bent portions 8 of the legs 7, 7 on the mirror fixing member 4 are brought into linear contact with the front surface of the total reflection mirror 3.

Therefore, according to the first embodiment, the single mirror fixing member 4 is used to be able to fix the half mirror 2 and the total reflection mirror 3 at the same time, so that it is possible to dispense with a spring, or an adhesive, or a pressure jig, which are conventionally used to fix a total reflection mirror, thus enabling reducing working processes. Also, since the bent portions 8 of the legs 7, 7 on the mirror fixing member 4 are brought into linear contact with the front surface of the total reflection mirror 3, there is no fear that the total reflection mirror is injured by the mirror fixing member 4.

Figure 5:
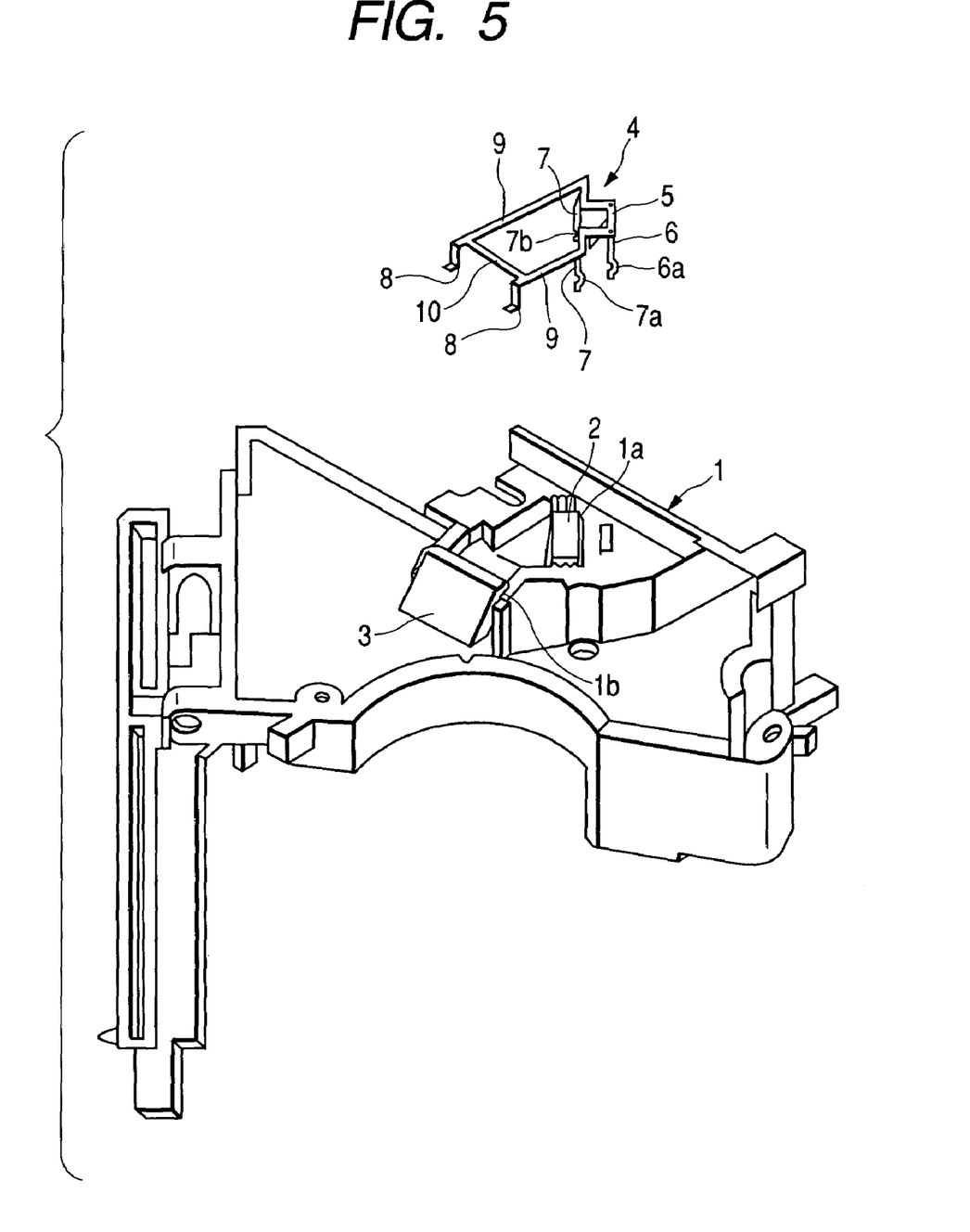
FIG. 5 is an exploded, perspective view showing a state immediately before a mirror in a mirror fixing structure for an optical pickup, according to a second embodiment of the invention, is fixed.
Figure 6:
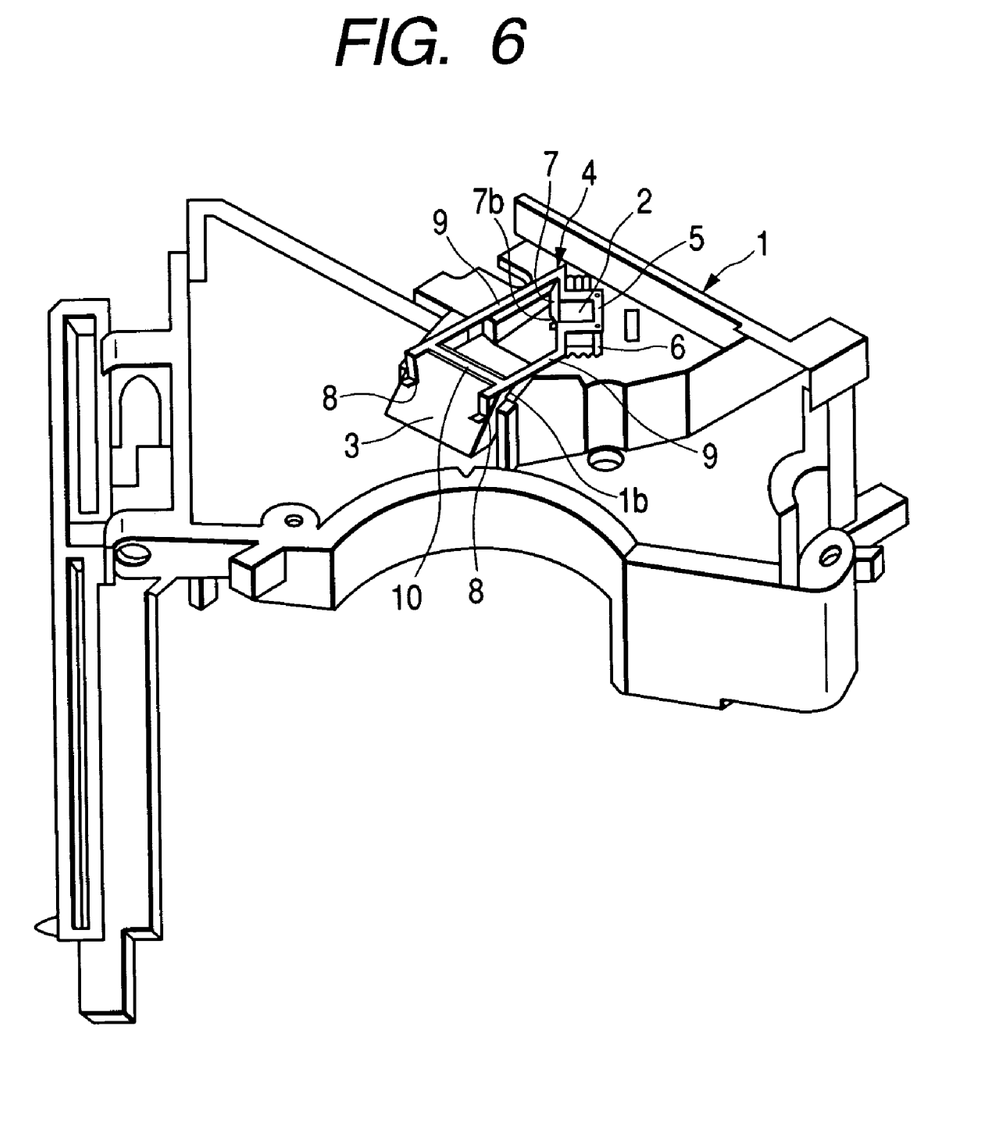
FIG. 6 is a perspective view showing a state when a mirror in the structure is fixed.
Figure 7:
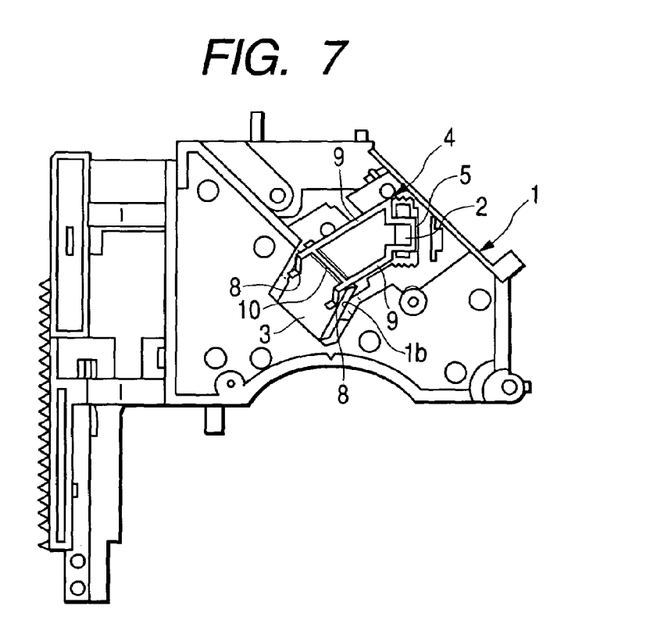
FIG. 7 is a plan view showing a state when the mirror in the structure is fixed.
Figure 8:
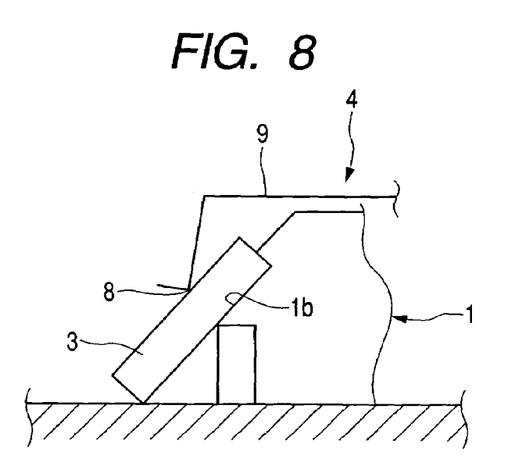
FIG. 8 is a fragmentary, front view showing a state, in which a total reflection mirror is fixed by a mirror fixing member in the structure.

FIG. 5 is an exploded, perspective view showing a state immediately before a mirror in a mirror fixing structure for an optical pickup, according to a second embodiment of the invention, is fixed, FIG. 6 is a perspective view showing a state when a mirror in the structure is fixed, FIG. 7 is a plan view showing a state when the mirror in the structure is fixed, and FIG. 8 is a fragmentary, front view showing a state, in which a total reflection mirror is fixed by a mirror fixing member in the structure. In addition, the same members and the same locations as those in the first embodiment are denoted by the same reference numerals, and an explanation therefor is omitted.

In the mirror fixing structure for an optical pickup, according to the second embodiment, a connection piece 10 is arranged in an appropriate location forwardly of a pair of right and left arms 9, 9 to bridge across the arms in a right and left direction as shown in FIGS. 5, 6, and 7.

Therefore, according to the second embodiment, since front portions of the pair of right and left arms 9, 9 are connected together by the connection piece 10, it is possible to prevent a spacing between the respective arms 9, 9 from enlarging and the arms 9, 9 from bending, thus enabling reinforcing the arms 9, 9 with the connection piece 10.

As described above, a first aspect of the invention provides a mirror fixing structure for an optical pickup, in which a half mirror and a total reflection mirror are set in predetermined locations in the optical pickup so that the half mirror and the total reflection mirror are fixed in a manner to be prevented from coming off, the mirror fixing structure being characterized by a mirror fixing member that includes a substantially C-shaped flat plate disposed rearward to hold the half mirror, a single first leg provided rearward of the flat plate to extend downward and inserted between a rear surface of the half mirror and a rear wall of a mount recess, a pair of second right and left legs extended downward from a front of the flat plate and pressed against a front surface of the half mirror to fix the half mirror, and a pair of right and left arms extended forward from the front of the flat plate to a position, in which the total reflection mirror is set, and shaped such that front portions thereof are bent obliquely downward, tip ends thereof are bent in a manner to warp forward, and bent portions thereof are pushed against a front surface of the total reflection mirror, so that effects are produced as described below.

That is, the single mirror fixing member is used to be able to fix the half mirror 2 and the total reflection mirror at the same time, so that it is possible to dispense with a spring, or an adhesive, or a pressure jig, which are conventionally used to fix a total reflection mirror, thus enabling reducing working processes. Further, since the flat plate is formed to be substantially C-shaped, a substantially entire upper surface of the half mirror can be held by the flat plate and the half mirror can be prevented from coming off from the mount recess.

A second aspect of the invention provides a mirror fixing structure for an optical pickup, in which a half mirror and a total reflection mirror are set in predetermined locations in the optical pickup so that the half mirror and the total reflection mirror are fixed in a manner to be prevented from coming off, the mirror fixing structure being characterized by a mirror fixing member that includes a flat plate disposed rearward to hold half mirror, a first leg provided rearward of the flat plate to extend downward and inserted between a rear surface of the half mirror and a rear wall of amount recess, a second leg extended downward from a front of the flat plate and pressed against a front surface of the half mirror to fix the half mirror, and a pair of right and left arms extended forward from the front of the flat plate to a position, in which the total reflection mirror is set, and shaped such that front portions thereof are bent obliquely downward, tip ends thereof are bent in a manner to warp forward, and bent portions thereof are pushed against a front surface of the total reflection mirror, so that effects are produced as described below.

That is, the single mirror fixing member is used to be able to fix the half mirror 2 and the total reflection mirror at the same time, so that it is possible to dispense with a spring, or an adhesive, or a pressure jig, which are conventionally used to fix a total reflection mirror, thus enabling reducing working processes.

According to a third aspect of the invention, the bent portions of the arms are brought into linear contact with the front surface of the total reflection mirror, so that there is no fear that the total reflection mirror is injured by the mirror fixing member 4.

According to a fourth aspect of the invention, the arms are provided in pair to include right and left ones and a connection piece is arranged in an appropriate location on a front side of the arms to bridge across the arms in a right and left direction, so that front portions of the pair of right and left arms are connected together by the connection piece, and so it is possible to prevent a spacing between the respective arms from enlarging and the arms from bending, thus enabling reinforcing the arms with the connection piece.

What is claimed is:

1. A mirror fixing structure for an optical pickup, in which a half mirror and a total reflection mirror are set in predetermined locations in the optical pickup so that the half mirror and the total reflection mirror are fixed in a manner to be prevented from coming off, the mirror fixing structure comprising:

a substantially C-shaped flat plate disposed rearward to hold the half mirror;

a single first leg provided rearward of the flat plate to extend downward and inserted between a rear surface of the half mirror and a rear wall of a mount recess;

a pair of second right and left legs extended downward from a front of the flat plate and pressed against a front surface of the half mirror to fix the half mirror; and a pair of right and left arms extended forward from the front of the flat plate to a position, in which the total reflection mirror is set, and shaped such that front portions thereof are bent obliquely downward, tip ends thereof are bent in a manner to warp forward, and bent portions thereof are pushed against a front surface of the total reflection mirror.

2. A mirror fixing structure for an optical pickup, in which a half mirror and a total reflection mirror are set in predetermined locations in the optical pickup so that the half mirror and the total reflection mirror are fixed in a manner to be prevented from coming off, the mirror fixing structure comprising:

a flat plate disposed rearward to hold half mirror, a first leg provided rearward of the flat plate to extend downward and inserted between a rear surface of the half mirror and a rear wall of a mount recess, a second leg extended downward from a front of the flat plate and pressed against a front surface of the half mirror to fix the half mirror, and a pair of right and left arms extended forward from the front of the flat plate to a position, in which the total reflection mirror is set, and shaped such that front portions thereof are bent obliquely downward, tip ends thereof are bent in a manner to warp forward, and bent portions thereof are pushed against a front surface of the total reflection mirror.

3. The mirror fixing structure for an optical pickup, according to claim 2, wherein the bent portions of the arms are brought into linear contact with the front surface of the total reflection mirror.

4. The mirror fixing structure for an optical pickup, according to claim 2, wherein the arms are provided in pair to include right and left ones and a connection piece is arranged in an appropriate location on a front side of the arms to bridge across the arms in a right and left direction.

* * * * *